(12) United States Patent
Marvi et al.

(10) Patent No.: US 12,157,984 B2
(45) Date of Patent: Dec. 3, 2024

(54) SYSTEMS AND METHODS FOR A MULTI-MODAL SCREW PROPELLED EXCAVATION

(71) Applicants: Hamidreza Marvi, Chandler, AZ (US); Andrew Thoesen, Scottsdale, AZ (US); Marko Green, Mesa, AZ (US); Justin Martia, Tempe, AZ (US)

(72) Inventors: Hamidreza Marvi, Chandler, AZ (US); Andrew Thoesen, Scottsdale, AZ (US); Marko Green, Mesa, AZ (US); Justin Martia, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 825 days.

(21) Appl. No.: 17/105,011

(22) Filed: Nov. 25, 2020

(65) Prior Publication Data

US 2021/0156108 A1    May 27, 2021

Related U.S. Application Data

(60) Provisional application No. 62/940,016, filed on Nov. 25, 2019.

(51) Int. Cl.
*E02F 3/20* (2006.01)
*B60F 3/00* (2006.01)
*B64G 1/16* (2006.01)
*E02F 3/24* (2006.01)

(52) U.S. Cl.
CPC .............. *E02F 3/20* (2013.01); *B60F 3/0023* (2013.01); *B64G 1/16* (2013.01); *E02F 3/246* (2013.01)

(58) Field of Classification Search
CPC ... E02F 3/186; E02F 3/20; E02F 3/243; E02F 3/246; E02F 3/7645; E02F 3/7654; B60F 3/0023; B64G 1/16
See application file for complete search history.

(56) References Cited

U.S. PATENT DOCUMENTS 2,376,647 A * 5/1945 Akins ................... B60F 3/0023
440/12.53
3,014,292 A * 12/1961 Fisher ..................... E02F 3/657
37/426
3,250,239 A * 5/1966 Garate ..................... B63H 1/38
440/12.65

(Continued)

FOREIGN PATENT DOCUMENTS

| CN | 108944301 A * | 12/2018 | ............ B60F 3/0023 |
| WO | WO-2014168517 A1 * | 10/2014 | ............ B60F 3/0023 |
| WO | 2020191399 A1 | 9/2020 | |

OTHER PUBLICATIONS

U.S. Appl. No. 17/201,616, filed Mar. 15, 2021, Marvi et al.

(Continued)

*Primary Examiner* — Gary S Hartmann
(74) *Attorney, Agent, or Firm* — Polsinelli PC

(57) ABSTRACT

A multi-modal screw propelled excavation system for small body sample collection includes a craft having screw-shaped wheels to traverse the surface of the target body. When the craft is ready to collect a sample, the craft opens a door to an excavation bin on a bottom face of the craft, and uses the screw-shaped wheels to churn up regolith which is captured by closing the door.

15 Claims, 13 Drawing Sheets

(56) References Cited

U.S. PATENT DOCUMENTS

| | | | | |
|---|---|---|---|---|
| 3,354,861 | A * | 11/1967 | Wilcox | B60F 3/0023 |
| | | | | 440/12.65 |
| 3,396,690 | A * | 8/1968 | Tsunazawa | B62D 57/02 |
| | | | | 440/12.65 |
| 3,420,326 | A * | 1/1969 | Kusmer | B60F 3/0023 |
| | | | | 180/6.2 |
| 3,797,139 | A * | 3/1974 | Larralde | E02F 9/067 |
| | | | | 37/310 |
| 5,509,370 | A * | 4/1996 | Kovacs | B60F 3/0023 |
| | | | | 180/7.2 |
| 7,255,618 | B2 * | 8/2007 | Leonov | B60F 3/0023 |
| | | | | 440/98 |
| 8,430,044 | B2 * | 4/2013 | Foo | B62D 57/036 |
| | | | | 440/12.65 |
| 10,076,938 | B2 * | 9/2018 | Olmedo | G01N 3/42 |
| 2020/0286657 | A1 | 9/2020 | Marvi et al. | |
| 2020/0324415 | A1 | 10/2020 | Marvi et al. | |
| 2022/0259070 | A1 * | 8/2022 | Munro | B62D 57/036 |

OTHER PUBLICATIONS

Ajluni, et al., OSIRIS-REX, returning the asteroid sample, 2015 IEEE Aerospace Conference, Big Sky, MT, 2015, pp. 1-15, doi: 10.1109/AERO.2015.7118988.-13.

Aoki, et al., Development of a transformable three-wheeled lunar rover: Tri-star iv. Journal of Field Robotics, 31 (1):206-223, 2014.

Barraclough, et al., Phootprint: A European Phobos Sample Return Mission. 11th International Planetary Probe Workshop. Airbus Defense and Space (2015)-1. Jun. 16, 2014.

Beaty, et al., The potential science and engineering value of samples delivered to Earth by Mars sample return. Meteorit Planet Sci, 54: 667-671. doi:10.1111/maps.13232-2. 2019.

Bierhaus, et al., The OSIRIS-REX Spacecraft and the Touch-and-Go Sample Acquisition Mechanism (TAGSAM). Space Sci Rev 214, 107, Space Sci Rev 214, 107 (2018) https://doi.org/10.1007/s11214-0180521-6 -3.

Brownlee, et al., Stardust: Comet and interstellar dust sample return mission, J. Geophys. Res., 108, 8111, doi: 10.1029/2003JE002087, E10.-4. 2003.

Burchell, et al., Sample return missions to minor bodies, Astronomy & Geophysics, vol. 54, Issue 3, Jun. 2013, pp. 3.28-3.32, https://doi.org/10.1093/astrogeo/att082 -9.

Ding, et al., Interaction mechanics model for rigid driving wheels of planetary rovers moving on sandy terrain with consideration of multiple physical effects. Journal of Field Robotics, 32(6):827-859, 2015.

Dvorsky, New Photos Show the Surprisingly Big Crater Blasted Into Asteroid Ryugu by Japan's Hayabusa2 Probe. Retrieved Jul. 21, 2020, from https://gizmodo.com/new-photos-show-the-surprisingly-big-crater-blasted-int-1834298147 -5. Apr. 25, 2019.

Gal-Edd and A. Cheuvront, "The OSIRIS-REX Asteroid Sample Return Mission operations design," 2015 IEEE Aerospace Conference, Big Sky, MT, 2015, pp. 1-9, doi: 10.1109/AERO.2015.7118883.-7.

Heverly, et al., Traverse performance characterization for the mars science laboratory rover. Journal of Field Robotics, 30(6):835-846, 2013.

Inotsume, et al., Analysis of grouser performance to develop guidelines for design for planetary rovers. In Proceedings of the 12th Inter-national Symposium on Artificial Intelligence, Robotics and Automation in Space (i-SAIRAS 2014), 2014.

Kobayashi, et al., Mobility performance of a rigid wheel in low gravity environments. Journal of Terramechanics, 47 (4):261-274, 2010.

Li, et al., A terradynamics of legged locomotion on granular media. science, 339(6126):1408-1412, 2013.

Lichtenheldt, et al., Screw-driven robot for locomotion into sand. Sep. 2017.

Mission Overview/Mission Flow: MMX—Martian Moons exploration. (n.d.). Retrieved Jul. 21, 2020, from http://mmx.isas.jaxa.jp/en/mission/ -11.

Moreland, et al., Soil behavior of wheels with grousers for planetary rovers. In 2012 IEEE Aerospace Conference, pp. 1-8. IEEE, 2012.

Moreland, Traction Processes of Wheels on Loose, Granular Soil. PhD thesis, Doctoral Dissertation, Carnegie Mellon University, 2013.

Mueller, et al., Regolith advanced surface systems operations robot (rassor). In Aerospace Conference, 2013 IEEE, pp. 1-12. IEEE, 2013.

Nesnas, et al., Axel and duaxel rovers for the sustainable exploration of extreme terrains. Journal of Field Robotics, 29 (4):663-685, 2012. doi: 10.1002/rob.21407. URL https://onlinelibrary.wiley.com/doi/abs/10.1002/rob.21407.

Nesnas, et al., Moon diver: A discovery mission concept for understanding the history of secondary crusts through the exploration of a lunar mare pit. pp. 1-23, Mar. 2019. doi: 10.1109/AERO.2019.8741788.

Rentschler, et al., Mechanical design of robotic in vivo wheeled mobility. Journal of Mechanical Design, 129 (10):1037-1045, 2007.

Roehr, et al., Reconfigurable integrated multirobot exploration system (rimres): heterogeneous modular reconfigurable robots for space explo-ration. Journal of Field Robotics, 31(1):3-34, 2014.

Saiki, et al., The Small Carry-on Impactor (SCI) and the Hayabusa2 Impact Experiment. Space Science Reviews. 208. 1-22. 10.1007/s11214-016-0297-5.-12. 2016.

Schempf, et al., Ultra-rugged soldier-robot for urban conflict missions. Technical report, Marine Corps Warfighting Lab Quantico, VA, 2003.

Skonieczny, et al., A grouser spacing equation for determining appropriate geometry of planetary rover wheels. In 2012 IEEE/RSJ International Conference on Intelligent Robots and Systems, pp. 5065-5070. IEEE, 2012.

Slonaker, et al., General scaling relations for locomotion in granular media. Physical Review E, 95(5):052901, 2017.

Suescun-Florez, et al., Geotechnical properties of bp-1 lunar regolith simulant. Journal of Aerospace Engineering, 28(5):04014124, 2014.

Sunspiral, et al., Development and field testing of the footfall planning system for the athlete robots. Journal of Field Robotics, 29(3):483-505, 2012.

Sutoh, et al., Traveling performance evaluation of planetary rovers on loose soil. Journal of Field Robotics, 29 (4):648-662, 2012. doi: 10.1002/rob.21405. URL https://onlinelibrary.wiley.com/doi/abs/10.1002/rob.21405.

Thoesen, et al., Comparative performance of granular scaling laws for lightweight grouser wheels in sand and lunar simulant, Powder Technology, vol. 373, 336-346.

Thoesen, et al., Helical granular scaling theory in lunar simulant, Manuscript submitted to Physical Review E.

Thoesen, et al., Helically-driven granular mobility and gravity-variant scaling relations, RSC Advances 9.22 (2019) 12572-12579. 2019.

Thoesen, et al., Revisiting scaling laws for robotic mobility in granular media, IEEE robotics and Automation letters 5.2 (2020): 1319-1325. 2020.

Thoesen, et al., Screw-generated forces in granular media: experimental, computation, and analytical comparison, AIChE Journal 65.3 (2019): 894-903. 2019.

Tsuda, et al., Hayabusa2-Sample return and kinetic impact mission to near-earth asteroid Ryugu. Acta Astronautica. 156. 10.1016/j.actaastro.2018.01.030.-16. 2018.

Vision and Voyages for Planetary Science in the Decade 2013-2022, NAP.edu. (n.d.). Retrieved Jul. 21, 2020, from https://www.nap.edu/read/13117/chapter/7 -17.

Voth, A new generation of military robots. IEEE Intelligent Systems, 19(4):2-3, Jul. 2004. doi: 10.1109/MIS.2004.30.

Wilcox, Athlete: A limbed vehicle for solar system exploration. In Aerospace Con-ference, 2012 IEEE, pp. 1-9. IEEE, 2012.

Wilcox, et al., Athlete: A cargo handling and manipulation robot for the moon. Journal of Field Robotics, 24(5):421-434, 2007.

(56) References Cited

OTHER PUBLICATIONS

Wong, Predicting the performances of rigid rover wheels on extraterrestrial surfaces based on test results obtained on earth. Journal of Terramechanics, 49(1):49-61, 2012.
Zaberchik, et al., Fabrication and Testing of the Cold Gas Propulsion System Flight Unit for the Adelis-SAMSON Nano-Satellites, Aerospace, vol. 6, 2019, p. 91. htttps://www.mdpi.com/2226-4310/6/8/91 -20.

* cited by examiner

SYSTEMS AND METHODS FOR A MULTI-MODAL SCREW PROPELLED EXCAVATION

CROSS-REFERENCE TO RELATED APPLICATIONS

This is a non-provisional application that claims benefit to U.S. provisional application Ser. No. 62/940,016 filed on Nov. 25, 2019, which is herein incorporated by reference in its entirety.

FIELD

The present disclosure generally relates to systems and methods for multi-modal screw propelled excavation.

BACKGROUND

Mobility in granular media often poses challenges due to the complexity of the material. These challenges are compounded when the granular media has not been well characterized for mobility due to either scarcity or handling difficulties, or both. These issues are further compounded with the additional challenges of space mobility. The impact of mass, shape, and dimension on mobility performance have been the subject of previous field research for both wheeled and helical mobility systems in sandy granular media. Sutoh et al. concluded that simulation predictions of the mobility performance of lightweight rovers are difficult using current terra-mechanics models. As an example, Dragon Runner, a 6.8 kg backpack-carried scout rover, was developed by the Marine Corps Warfighting Laboratory to be hand operated to provide ground reconnaissance in urban combat situations. However, it was noted that the rover had issues with granular mobility.

While the first sample return missions occurred on the moon during the Apollo era of space exploration, the past two decades have seen a focus on sample return missions for small bodies. Among these are missions such as Stardust, Hayabusa, Osiris-Rex, and Hayabusa2. Future proposed missions include Phootprint and MMX by the ESA and JAXA, respectively. Sample return missions can provide material that gives valuable insights into the formation and nature of primitive asteroids and terrestrial planets. While in-situ science on the small bodies enables data to be gathered, returned samples can complement scientific return with a much more extensive array of instrumentation available on Earth.

Sample return missions for small bodies have traditionally relied on contact from the primary spacecraft to obtain the sample. In the case of the TAGSAM sample collection method for OSIRIS-REx, the contact will be made, and the sample collected from a blast of nitrogen. In the case of Hayabusa and Hayabusa-2, the sample collection method is firing a projectile and capturing the regolith under its own reactive momentum. However, this physical contact represents some of the greatest mission risks/limitations throughout the life of the craft. There are three main challenges we want to address to transform the approach and possibilities of sample return missions to small bodies:

Coverage—The "touch and go" contact method only allows for a small number of samples to be collected from one target body; however, there are often multiple high-priority science areas that are desired for investigation. By releasing multiple lightweight rovers onto a single body, more of the surface can be investigated, and samples can be retrieved more easily from multiple locations. This coverage problem often becomes a risk calculation as well. For example, after the first surface sampling was completed for Hayabusa-2 and obtained a significant amount of regolith, the second surface sampling was postponed and was eventually canceled to decrease risk. Decoupling the sampler from the main craft and utilizing a swarm strategy change the amount of coverage possible. Even during optimal performance, a collection method attached to the orbiting craft will produce less coverage than a distributed method.

Mobility—Gathering surface data is useful for discovering more about the asteroid and giving context to the collected sample. Effective exploratory abilities require a robust rover design capable of collecting data on the surroundings as the rover drives. Tumblers have traditionally been used to take pictures and collect data; however, this approach may not lend itself to sample collection and may be hindered in higher gravity environments.

Risk Mitigation—Current sample collection orbiter missions rely on the entire spacecraft safely getting close enough to the surface to collect samples then returning into orbit. If this procedure fails, it can cost the whole spacecraft. Risk can be mitigated if the rover system can launch the sample system back into orbit where it can dock with the main spacecraft, possibly even continuing reconnaissance and gathering of surface data. This mitigates the risk for mission failure as it dispels the need for the entire spacecraft to come to the surface of the asteroid. It also reduces risk if there is a failure in one deployment. If one rover fails, the others can still succeed, leading to overall mission success It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
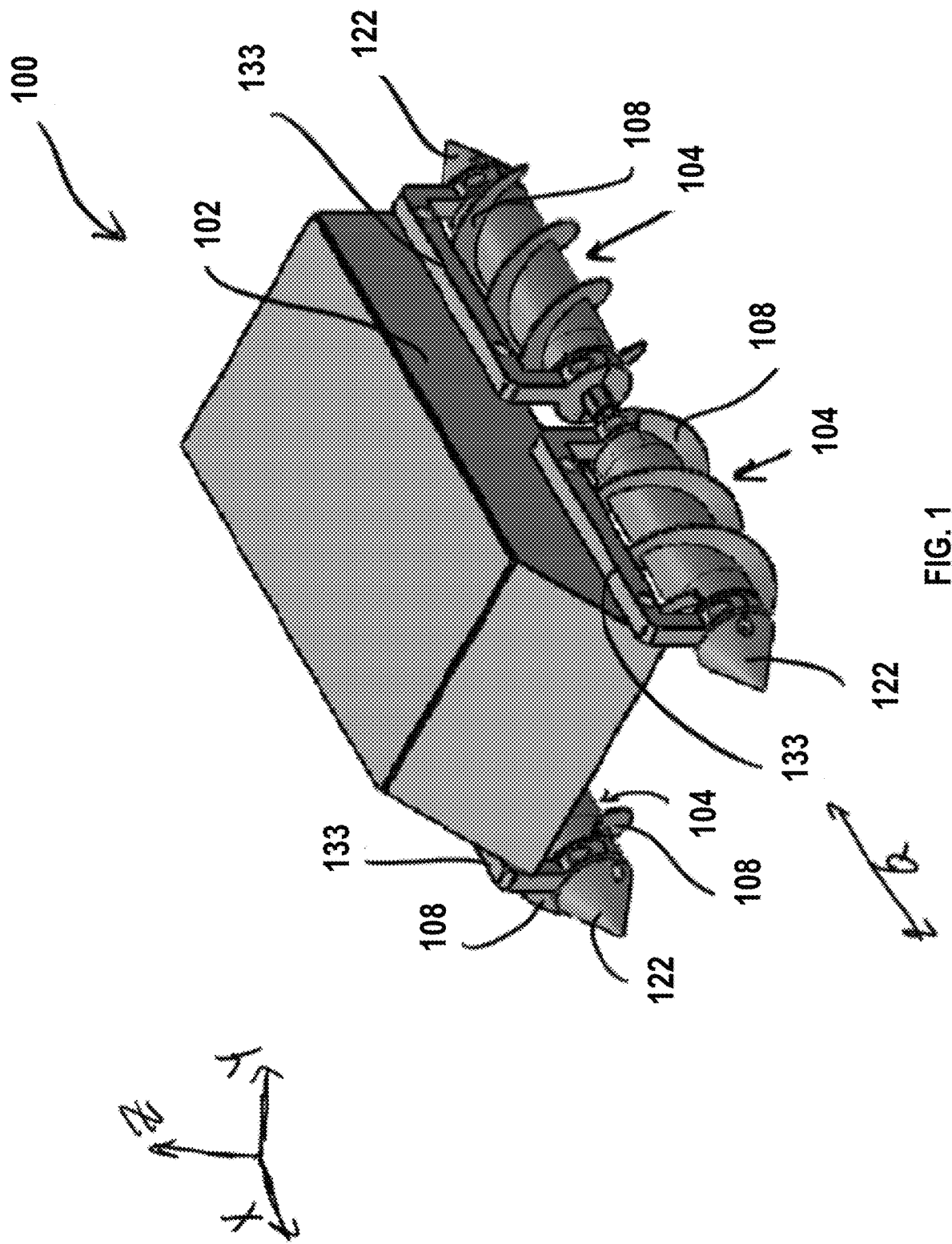
FIG. 1 is a perspective view of a first embodiment of a craft with a bihelix grouser wheels.
Figure 2:
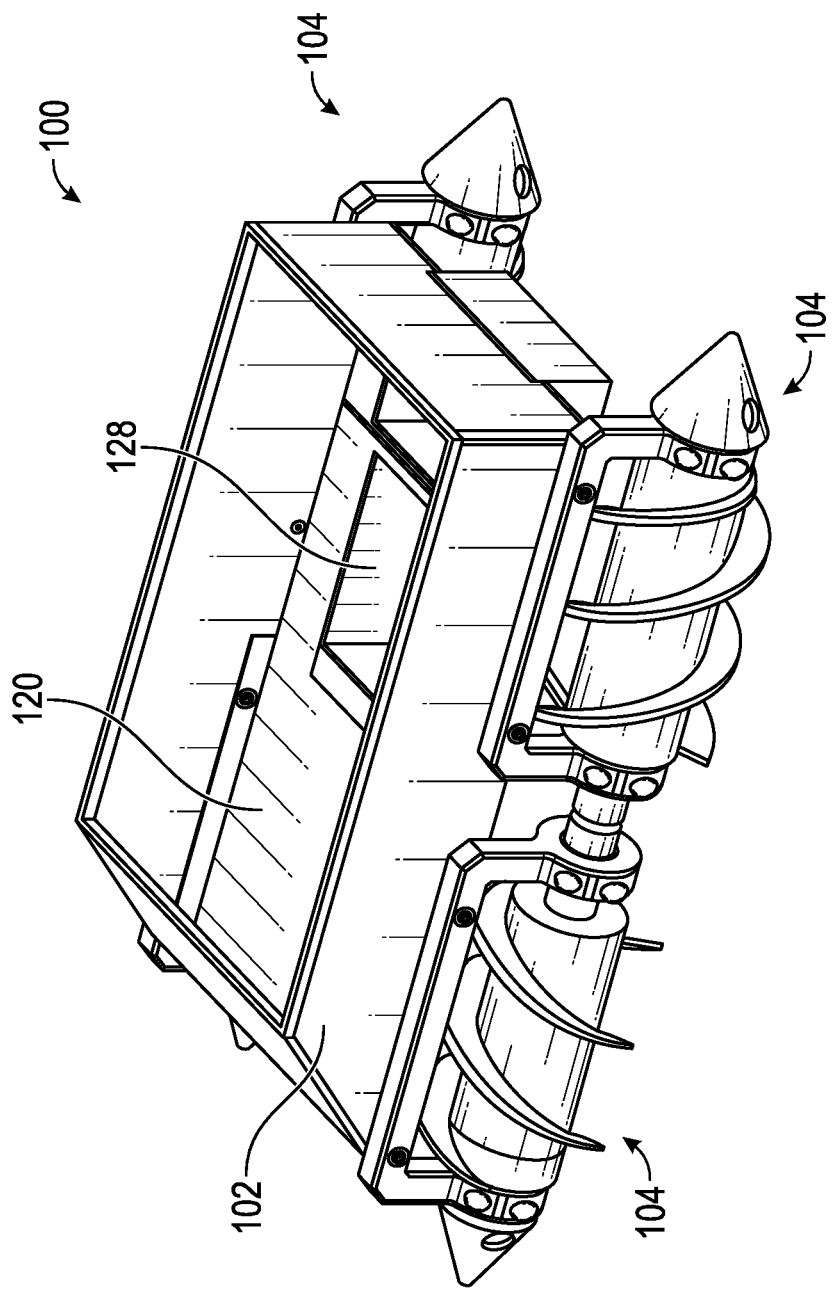
FIG. 2 is a perspective view of the craft of FIG. 1 showing the interior of the craft.
Figure 3:
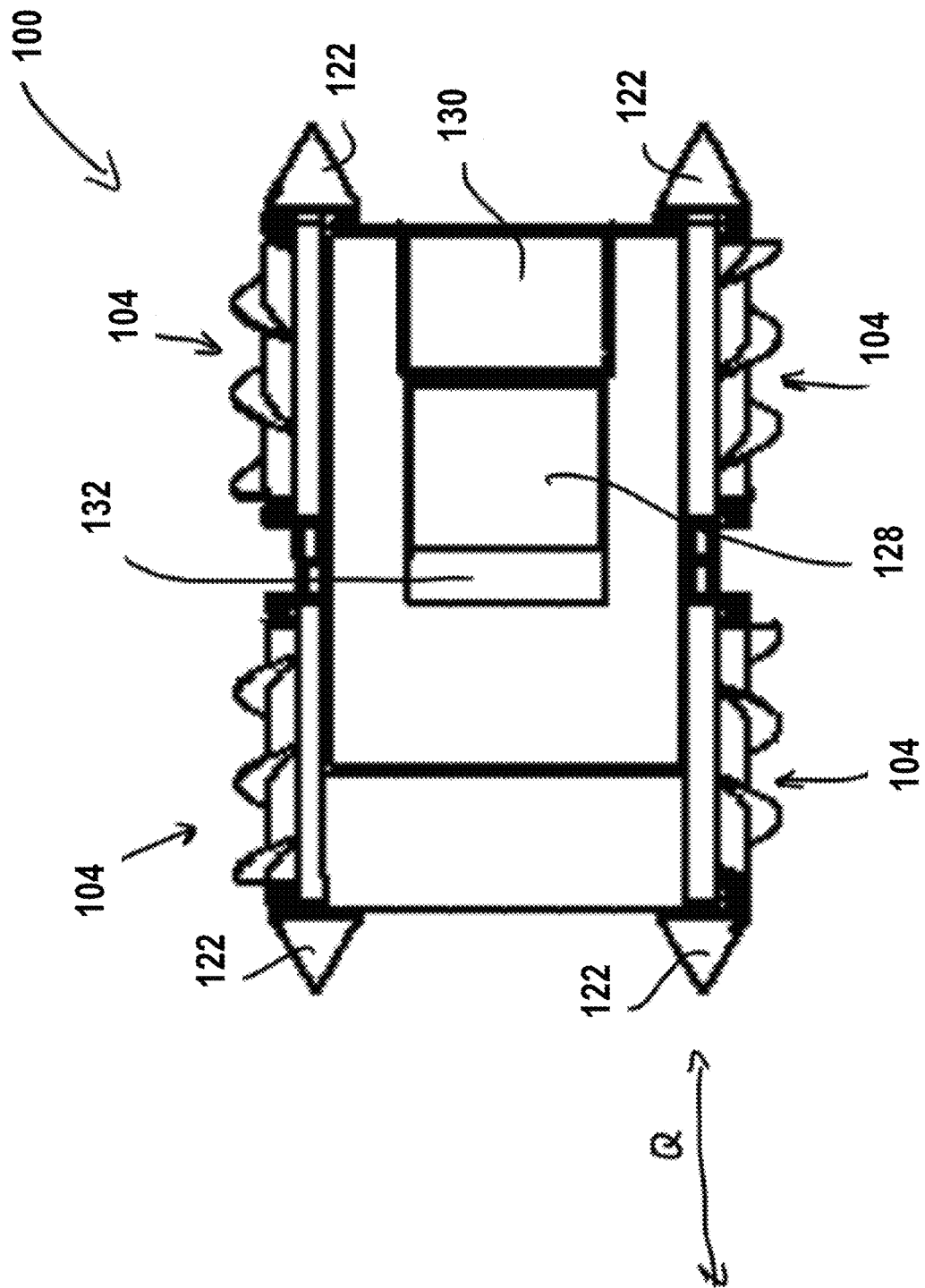
FIG. 3 is a top view of the craft of FIG. 1.
Figure 4:
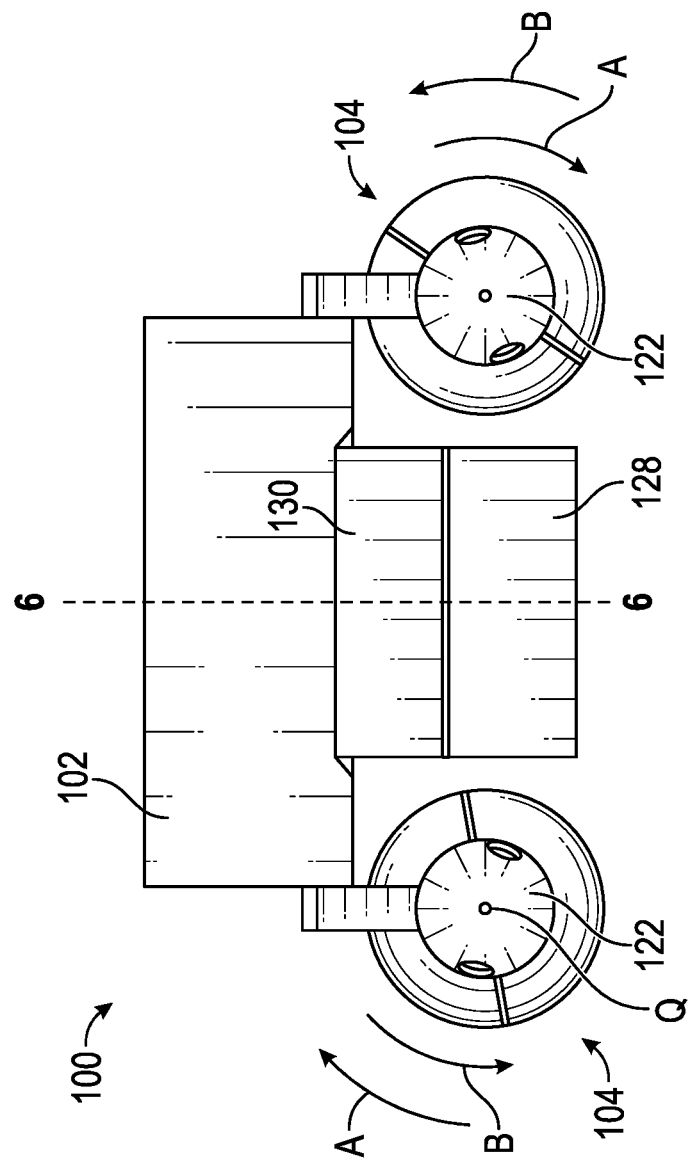
FIG. 4 is an end view of the craft of FIG. 1.
Figure 5:
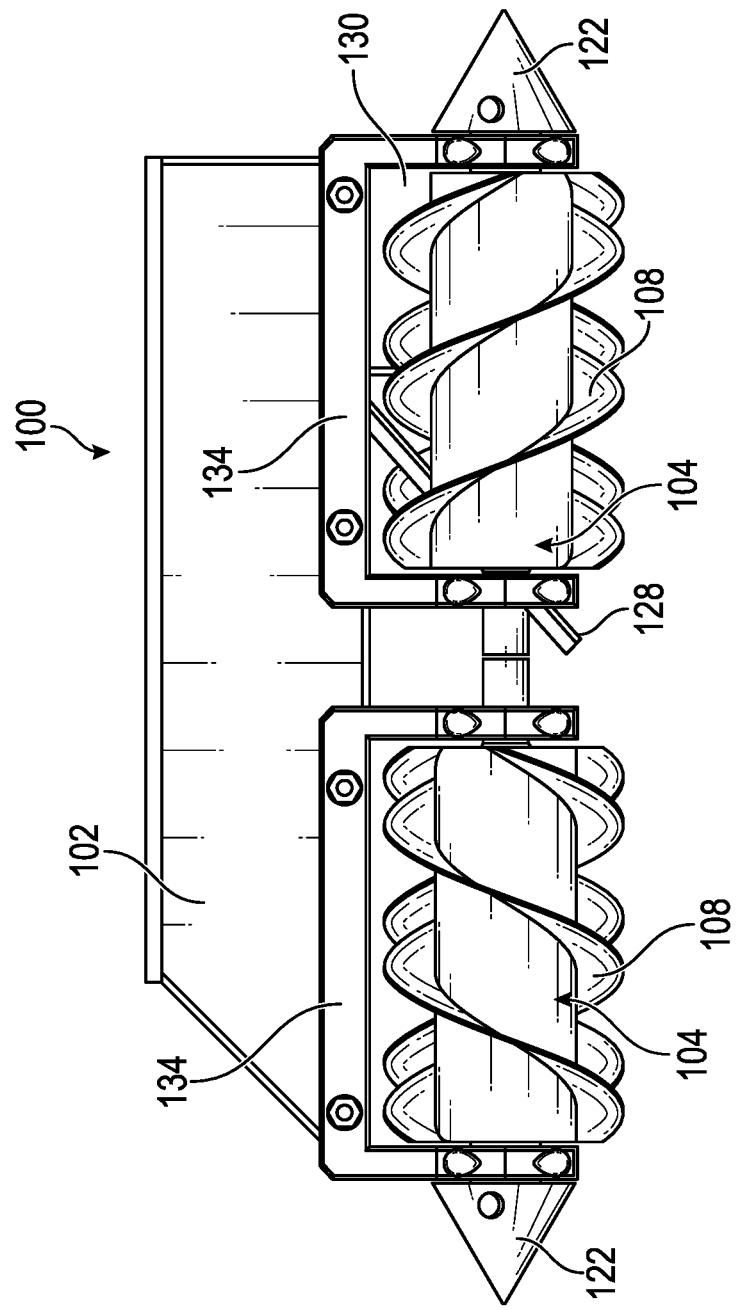
FIG. 5 is a side view of the craft of FIG. 1.
Figure 6:
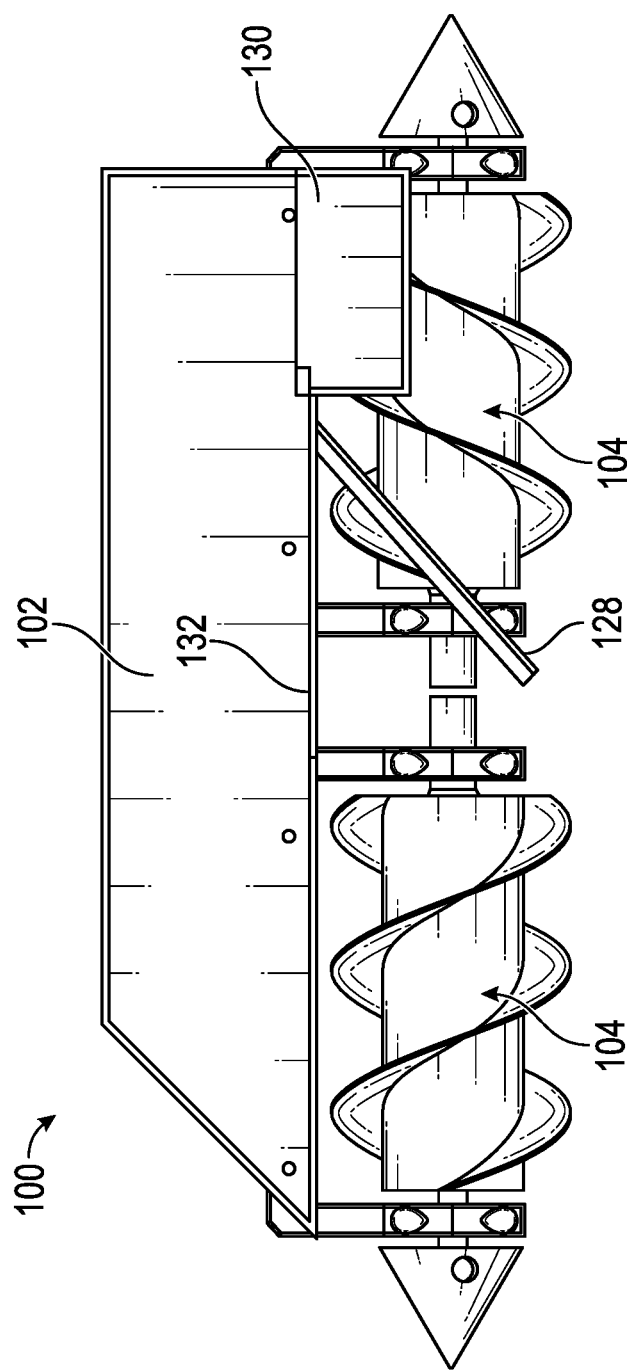
FIG. 6 is a cross-sectional view of the craft of FIG. 4, taken along line 6-6.

Various embodiments of a multi-modal screw propelled excavation system having a craft capable of multi-modal mobility are disclosed herein. In particular, the craft is a hybrid lander/rover/sample-collector for small celestial bodies with masses on the order of Phobos, one of the moons of Mars. The craft uses a cold gas propulsion system to land on the target body. Once on the surface, the craft uses an actuated Archimedes-screw pontoon surface mobility system to traverse the surface of the target body. When the craft is ready to collect a sample, the craft opens a door to an excavation bin on a bottom face of the craft, and uses the screw-shaped wheels to churn up regolith which is captured by closing the door. The craft can be outfitted with multiple sample collection bays. In some embodiments, a plurality of crafts can be used as part of a swarm architecture, where a parent orbiter would deploy the plurality of crafts to land and collect samples at many different sites on the target body before launching back into orbit and docking with the orbiter. The purpose of this technology is to improve upon current small body sample collection methods, which typically pose great risk to the parent spacecraft and are only able to collect samples from a limited number of sites on the target body. Referring to the drawings, embodiments of a craft having a multi-modal screw propelled excavation system are illustrated and generally indicated as 100 and 200 in FIGS. 1-13.

Figure 11:
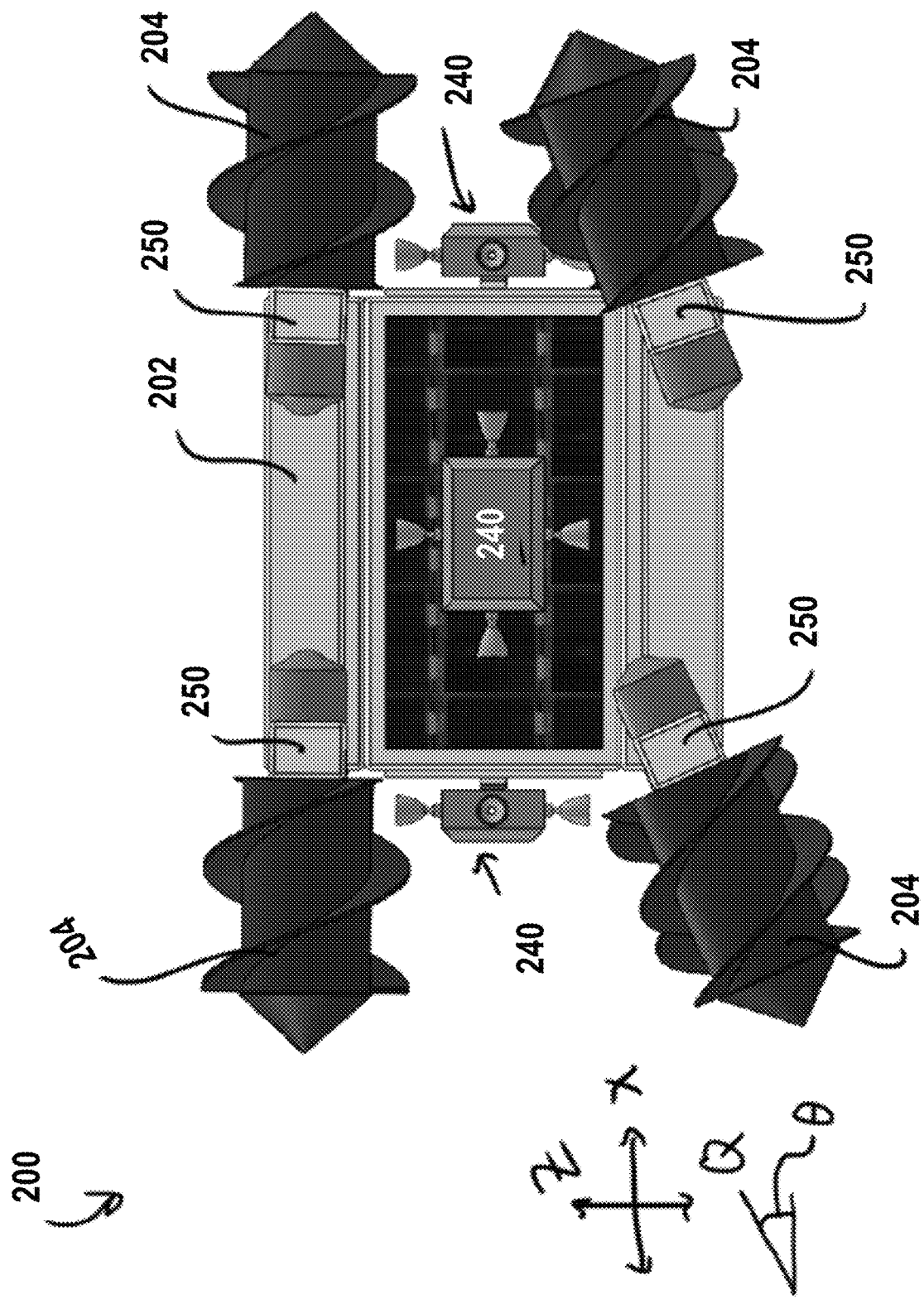
FIG. 11 is an illustration showing a side view of the craft of FIG. 8 with the wheels oriented in a "slope climbing" configuration.
Figure 12:
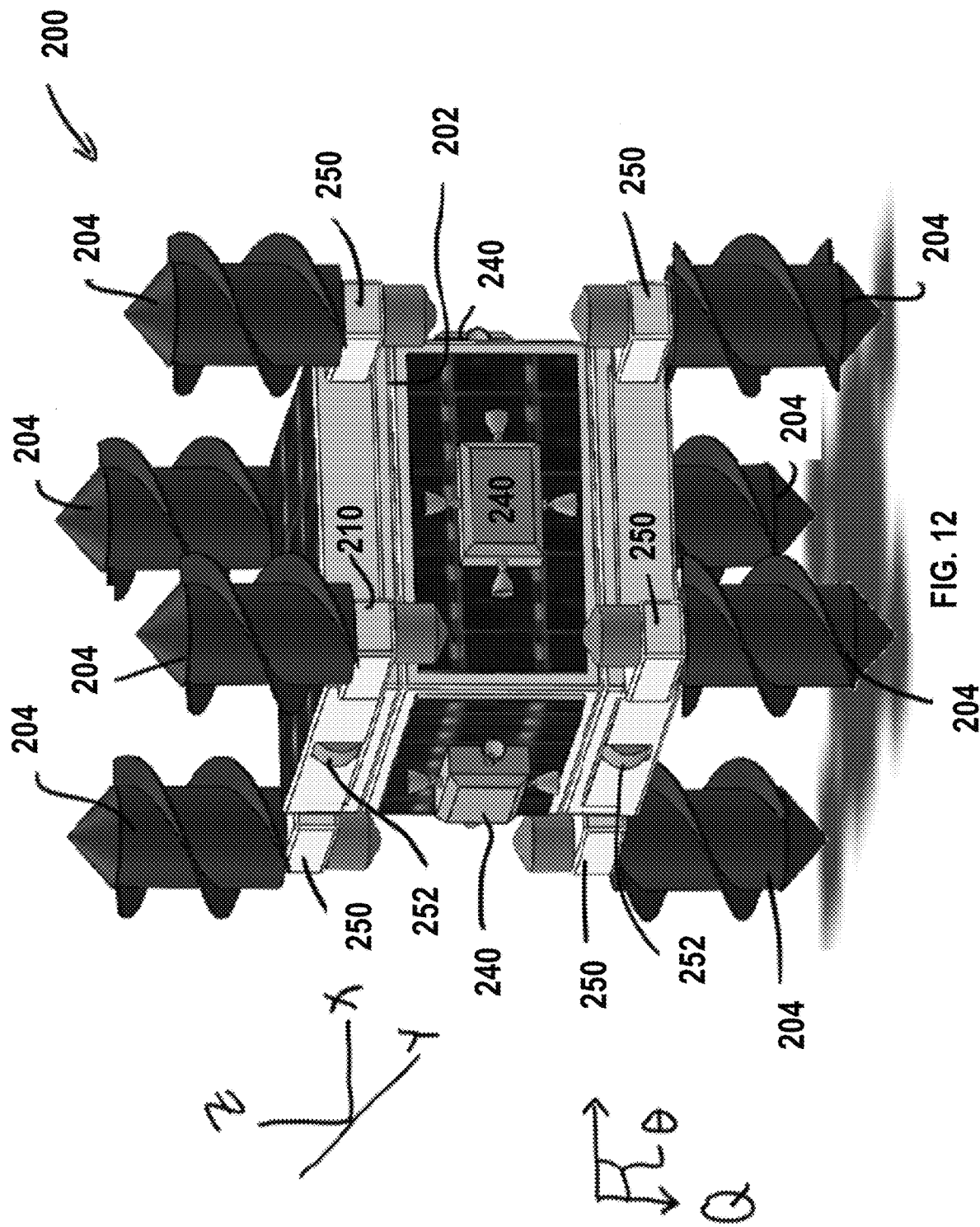
FIG. 12 is an illustration showing a perspective view of the craft of FIG. 8 with the wheels oriented in a "landing" configuration.

Referring to FIGS. 1-7, in one aspect, the craft 100 includes a housing 102 mounted on a plurality of wheels 104, each wheel 104 including an internal drivetrain 105 (FIG. 12). Each drivetrain 105 includes a respective motor 106 and is located inside each wheel 104 in order to protect the motor 106 from fine dust and debris. As shown, each motor 106 is oriented such that each wheel 104 is rotated about a wheel-defined axis Q, which can be oriented anywhere within an X-Z plane, as shown in FIG. 1. During operation, each wheel 104 is rotated about the wheel-defined axis Q in a first rotational direction A and an opposite second rotational direction B. In some embodiments, the craft 100 is multi-modal, allowing the wheels 104 to actuate and/or articulate such that the craft can mobilize forward and backward by counter-rotating the wheels 104 relative to each other, or the craft 100 can mobilize side-to-side by rotating the wheels 104 together in the same rotational direction. In particular, the wheels 104 can be divided into a first grouping and a second grouping, the first grouping of wheels 104 being associated with a first side of the craft 100 and the second grouping of wheels 104 being associated with a second side of the craft 100. Counterrotation of the first grouping of wheels 104 in a first rotational direction A relative to the second grouping of wheels 104 (in an opposite second rotational direction B) propels the craft forward or backward, however, when the first and second groupings of wheels 104 are rotated in the same rotational direction A or B, the craft 100 is propelled to the left or right. In one aspect, a blade portion 108 of each wheel 104 is configured to act as a grouser that creates extra traction for promoting locomotion. In a primary embodiment, the blade portion 108 resembles a screw, as shown in FIGS. 1-12. The craft 100 can mobilize slowly with a high drawbar force using counter-rotating wheels 104 as a screw-propelled vehicle. In some embodiments, the craft 100 allows for full planar movement, in two modes, with a single actuator dedicated to each wheel 104. Steering is achieved by modulating relative speed between each respective wheel 104. In some embodiments, the craft 100 is also operable for collection of material using the wheels 104 by opening an excavation ramp 128 and allowing material to be passively collected by skimming the excavation ramp 128 against the target environmental surface and counter-rotating the wheels 104 at high torque. The excavation ramp 128 feeds regolith up into an interior of the housing 102, where the material falls into a removable collection bin 130 disposed inside the housing 102 of the craft. After material collection, the excavation ramp 128 is lifted or otherwise closed. In the event of a regolith jam, the excavation ramp 128 can rapidly oscillate between positive and negative angles with respect to the horizontal plane of the craft, which should cause the material to fall into the collection bin 130. In some embodiments, the collection bin 130 can be quickly and autonomously swapped out, thereby allowing the craft to return to regolith excavation.

Referring to FIGS. 1-7, craft 100 includes a housing 102 having a plurality of wheels 104 mounted to opposite sides of the housing 102 via mounts 133. The housing forms an interior 120 in communication with an excavation system that excavates material as the craft 100 is propelled by operation of the wheels 104. In some embodiments, the bottom portion of the housing 102 forms an opening 132 in communication with an excavation ramp 128 that is operable to collect material along the area of the ground being traversed by the craft 100 and deposit that material into an excavation bin 130 located in the rear portion of the interior 120 of the housing 102. In some embodiments, the excavation ramp 128 is operable to change angle during the excavation operation performed by the craft 100.

Figure 7:
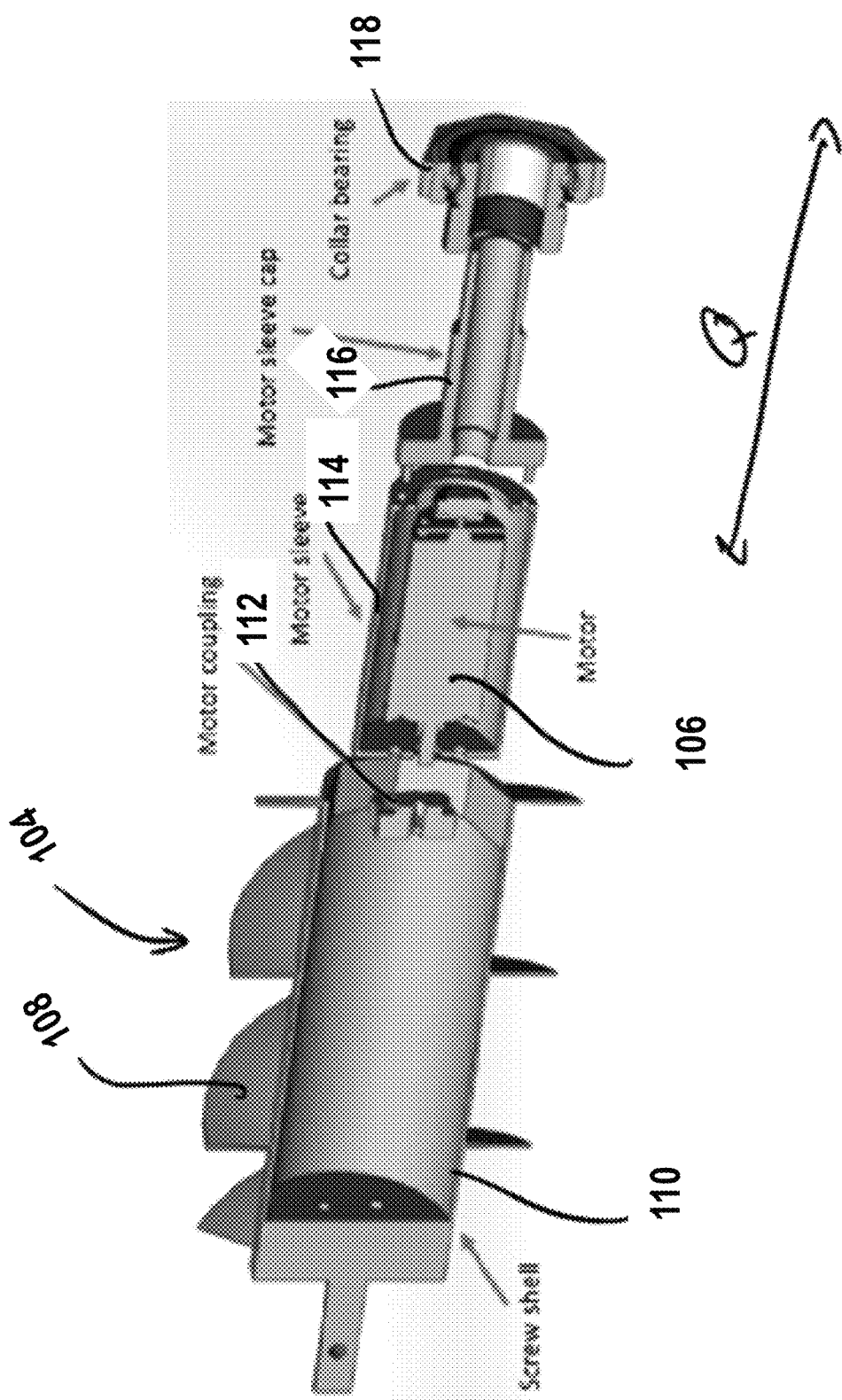
FIG. 7 is an exploded view of a wheel of the craft of FIG. 1.

The craft 100 is propelled by operation of four wheels 104 mounted in pairs along opposite sides of the housing 102. As shown in FIG. 7, the screw shell 110 of each wheel 104 is operatively coupled to a respective motor sleeve 104 through a motor coupling 112. A motor 106 is disposed within the motor sleeve 114 and is operable to rotate each wheel 104 and propel the craft 104. As shown, a motor sleeve cap 116 attached to a collar bearing 118 is coupled to the motor sleeve 104.

One embodiment of a craft 100 was designed to be multi-purpose, thereby allowing the wheels 104 to be easily interchanged with other types of wheels. In some embodiments, a modular undercarriage weight holder (not shown) is included on a bottom of the craft 100. A mounting height of the wheels 104 of the craft 100 was selected to keep a center of gravity of the craft 100 as low as possible without interfering with motion or operation of the wheels 104. A wheel mount width was selected to prevent the granular flow of material from each wheel 104 from actively interfering with each other during operation of the craft 100. Trade studies indicated that an internally-located motor 106 and associated drivetrain 105 (FIG. 15) for each wheel 104 was optimal due to the dusty nature of the operational environment. Any external belt or chain drive system would be susceptible to dust accumulation and this type of power transfer is also not typically used on rover vehicles for space applications. The drivetrain 105 relies on two bearings for smooth rotation. A sealed bearing (not shown in FIG. 16B) is pressure-fit onto a front shaft associated with each wheel 104. An internal collar bearing 118 is affixed to a back shaft 112 associated with each wheel 104 (henceforth referred to as wiretube 112) by a set screw. This collar bearing 118 is seated into an octagonal dust cover 126 which seals the internal cavity from BP-1 ingress. The dust cover 126 also locks the bearing 118 and wiretube 112 in a fixed position with respect to the wheel 104. This back bearing 118 allows the static wiretube 112 to lead wires out of the wheel 104 and into a housing 102 of the craft 100.

In the embodiment shown, a 12V DC motor 106 is fastened to its respective motor sleeve 114, via two small screws. The wiretube 112 has four radially symmetric pegs which pressure fit into a cutout pattern at an aft end of the motor sleeve 114. The tube shape transitions to a hexagonal one, and this hexagonal shaft is then locked to the craft 100 to create a single rigid body. Shaft power is transmitted from an output shaft of the motor 106 to a wheel hull through an aluminum set screw D-hub coupling. When supplied with power, the motor 106 is held static by the rigid body of the wiretube mounts locked into the body or housing 102 of the craft. Shaft power is transmitted to the wheel 104 and propels the craft 100.

One embodiment of craft 100 can be implemented using low-cost commercial off the shelf (COTS) electronic and mechanical components. The main components were an Arduino Uno R3, Pololu MC33926 motor driver, and a current sensor and wheel encoder per motor 106. The dual motor driver enabled the craft to adjust the voltage with response from an Arduino PID controller. Current sensors built into the dual motor controller were not precise enough to accurately compute power calculations; therefore a hall effect-based linear current sensor was implemented per motor 106. All electronics were enclosed and sealed in the housing 102 to minimize exposure to BP-1 dust.

Figure 8:
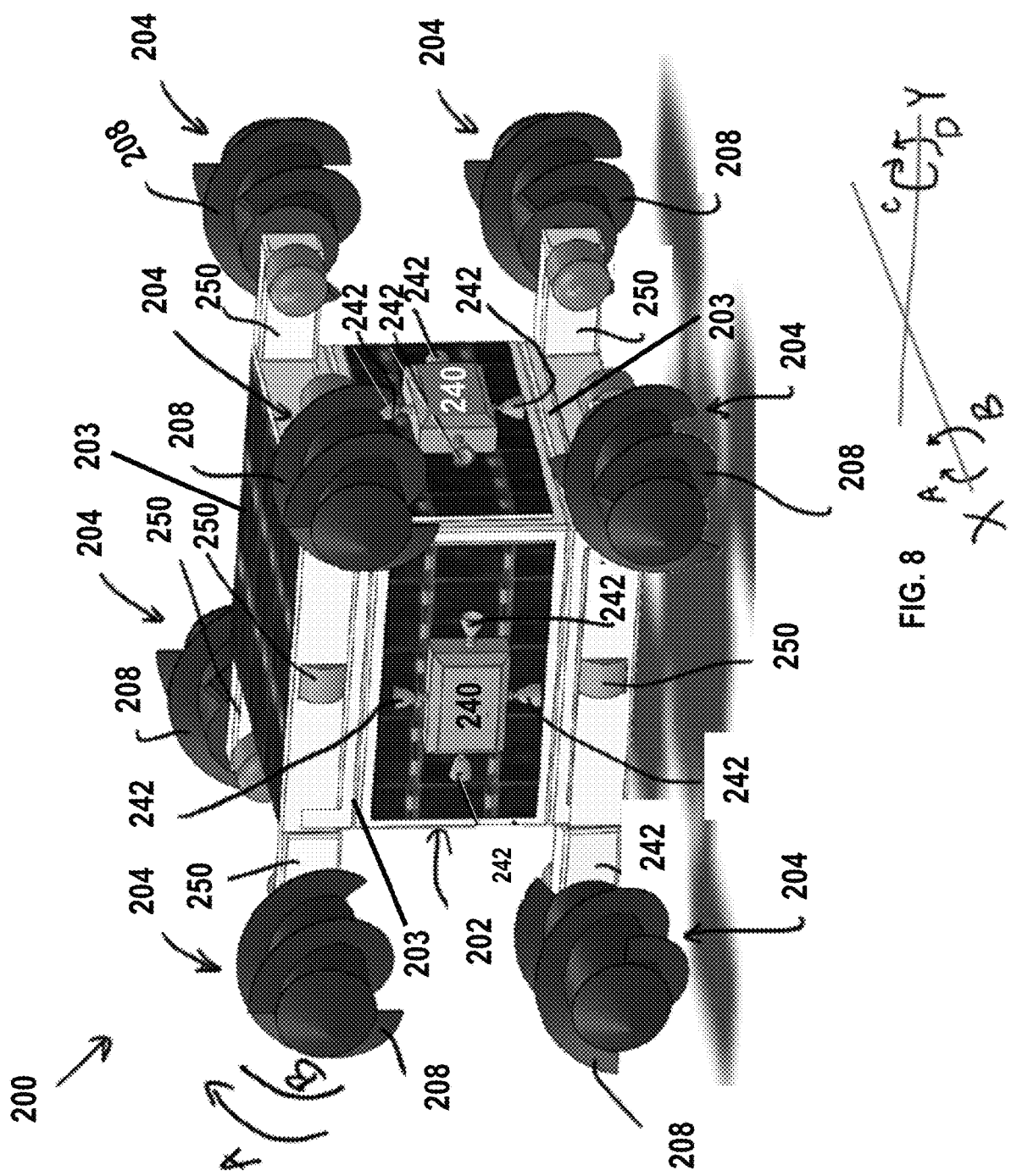
FIG. 8 is an illustration showing a perspective view second embodiment of a craft having bihelix grouser wheels and a plurality of thrusters.
Figure 9:
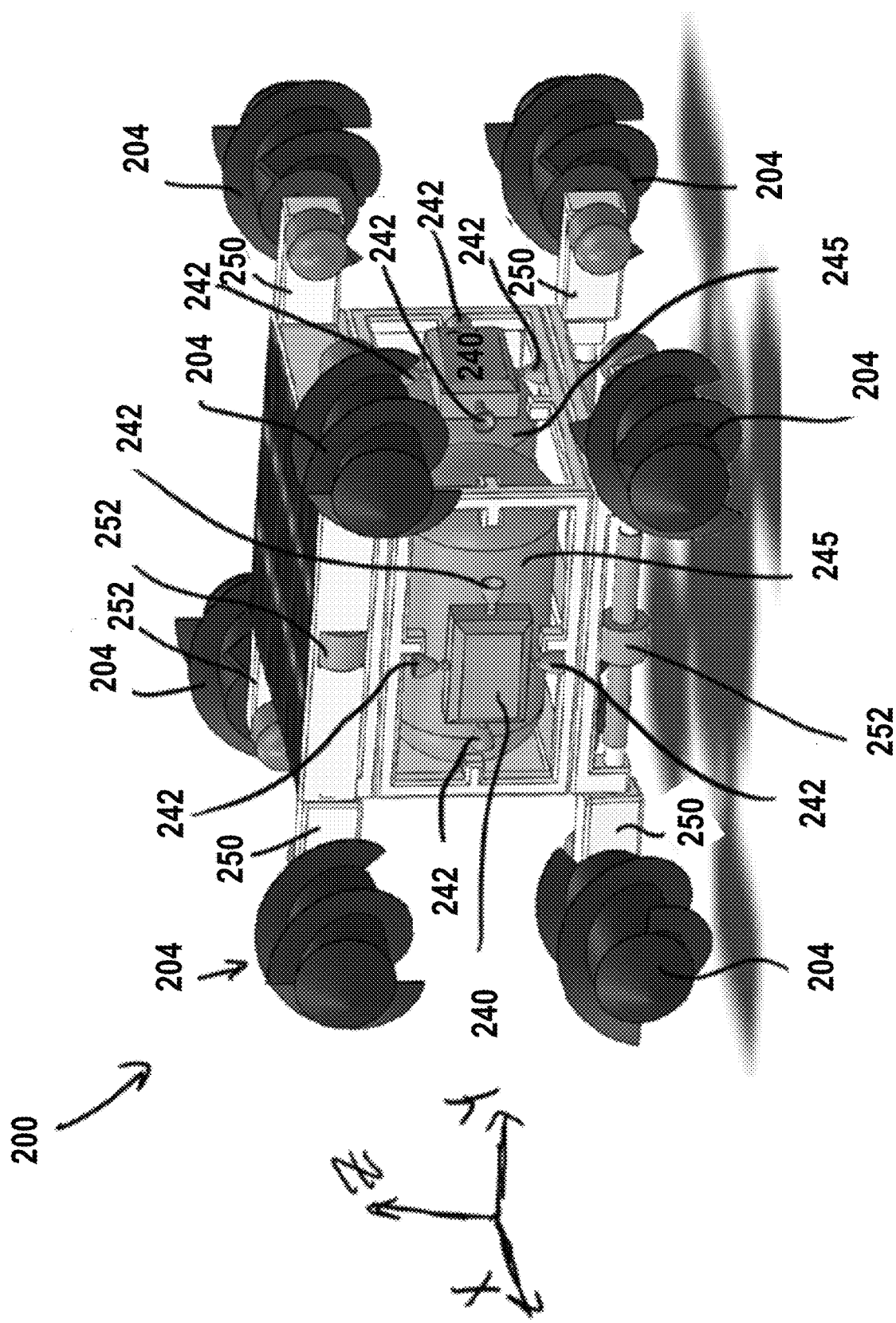
FIG. 9 is an illustration showing a cutaway perspective view of the craft of FIG. 8 showing a pair of propellant tanks in fluid flow communication with the plurality of thrusters.
Figure 10:
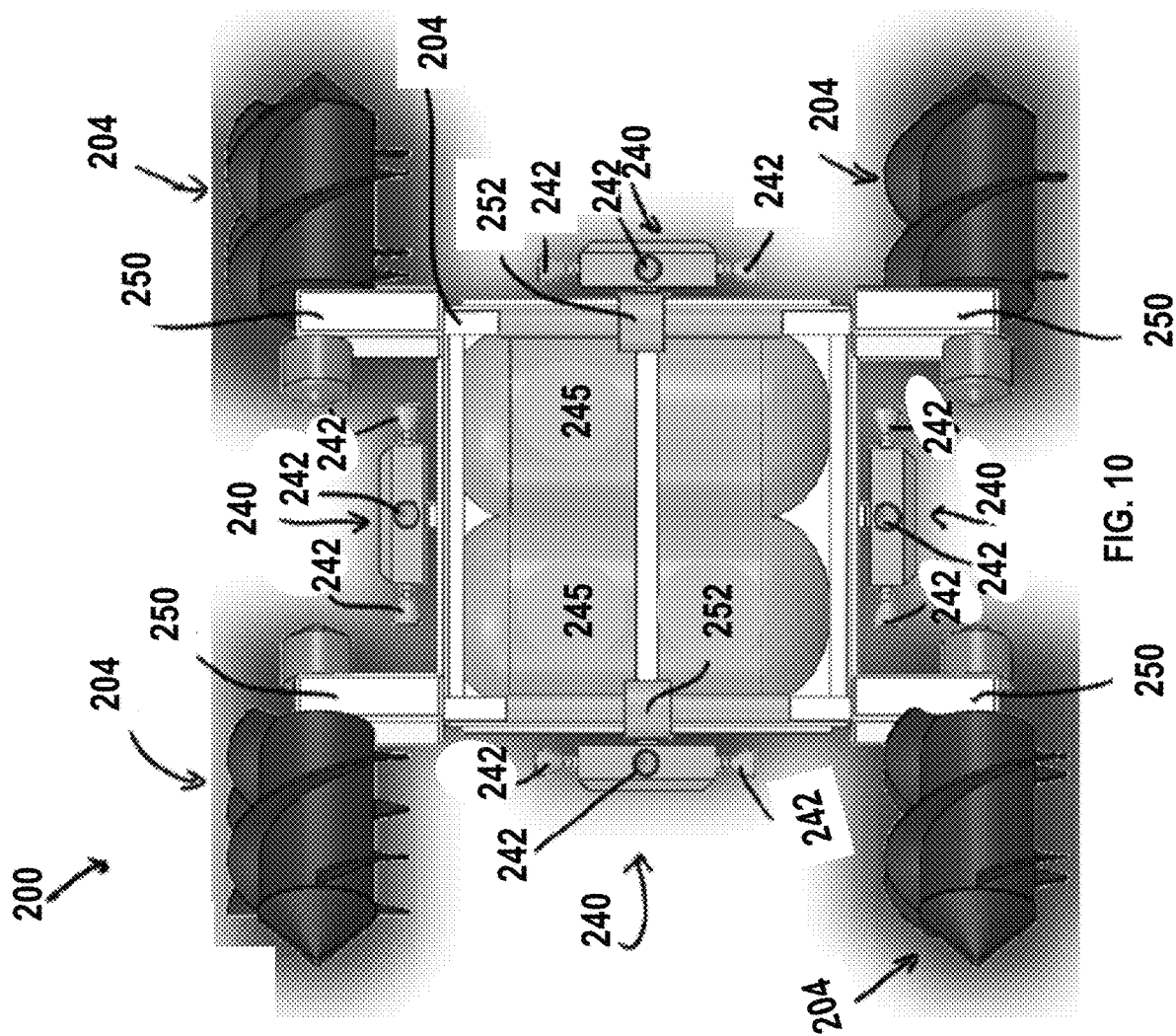
FIG. 10 is an illustration showing a top view of the craft of FIG. 8.

In some embodiments, such as embodiment 200 shown in FIGS. 8-12 and 13, the craft 200 can include elements of craft 100 but can also be equipped with one or more thruster modules 240 or other means of low-gravity propulsion for de-orbiting away from an orbiter 20 to a target body 30. As shown, craft 200 includes a generally cube-shaped housing 202 defining a plurality of faces 203 including four lateral faces, and each lateral face is associated with a thruster module 240. As shown in FIG. 9, each thruster module 240 includes a plurality of thrusters 242, each module 240 including at least one thruster 242 pointing upward, one thruster 242 pointing downward, one thruster 242 pointing away from a first side of the thruster module 240 and one thruster 242 pointing away from a second side of the thruster module 240 such that each thruster module 240 provides at least two degrees of freedom. In some embodiments, such as the embodiment shown in FIGS. 8-12, an arrangement of thruster modules 240 across each lateral face enables three degrees of freedom of the craft 200 in low-gravity space. Each thruster 242 is associated with one or more propellant tanks 245 including a propellant to provide gas propulsion to each thruster. In some embodiments, each thruster module 240 includes at least one line feeding propellant to the thruster module 240 from propellant tank 245 at high pressure. Each individual thruster 242 on the thruster module 240 would be activated via actuation of a valve (not shown), which would allow propellant to flow from the thruster module 240 out of a nozzle of that individual thruster 242. In some embodiments, the propellant is krypton, but other embodiments may include other suitable propellants such as nitrogen, argon, helium, amongst others, that might serve better based on individual attributes such as specific impulse, density at operational temperatures, and required tank insulation mass to prevent boiloff.

In the embodiment of FIGS. 8-12, the craft 200 includes four additional wheels 204 oriented towards a top face of the craft 200 to allow variability in a landing orientation of the craft 200. Similar to craft 100, the wheels 304 are operable for rotation in a first rotational direction A or an opposite second rotational direction B about a wheel-defined axis Q, axis Q being parallel with a direction of elongation of the wheels 104/204, as shown in FIG. 8. Counterrotation of the first grouping of wheels 204 in a first rotational direction A relative to the second grouping of wheels 104 (in an opposite second rotational direction B) propels the craft 200 forward or backward (parallel to axis Q), however, when the first and second groupings of wheels 204 are rotated in the same rotational direction A or B, the craft 200 is propelled to the left or right (perpendicular to axis Q).

As shown, in one embodiment of the craft 200, each wheel 204 is associated with the housing 202 by a respective leg 250. Each leg 250 is operatively associated with a pitch actuator 252 configured to rotate each leg 250 about a second horizontal axis Y in a third rotational direction C and an opposite fourth rotational direction D, as shown in FIGS. 8, 11 and 12. In some embodiments, each leg 250 is associated with a pitch actuator 252 by an axel 253. FIG. 11 shows bottom wheels 204 of the craft 200 being rotated θ degrees away from horizontal axis X about the second horizontal axis Y in a "slope climbing" mode. FIG. 12 shows bottom and top wheels 204 of the craft 200 having been rotated θ=90 degrees away from horizontal axis X in a "landing" mode.

Figure 13:
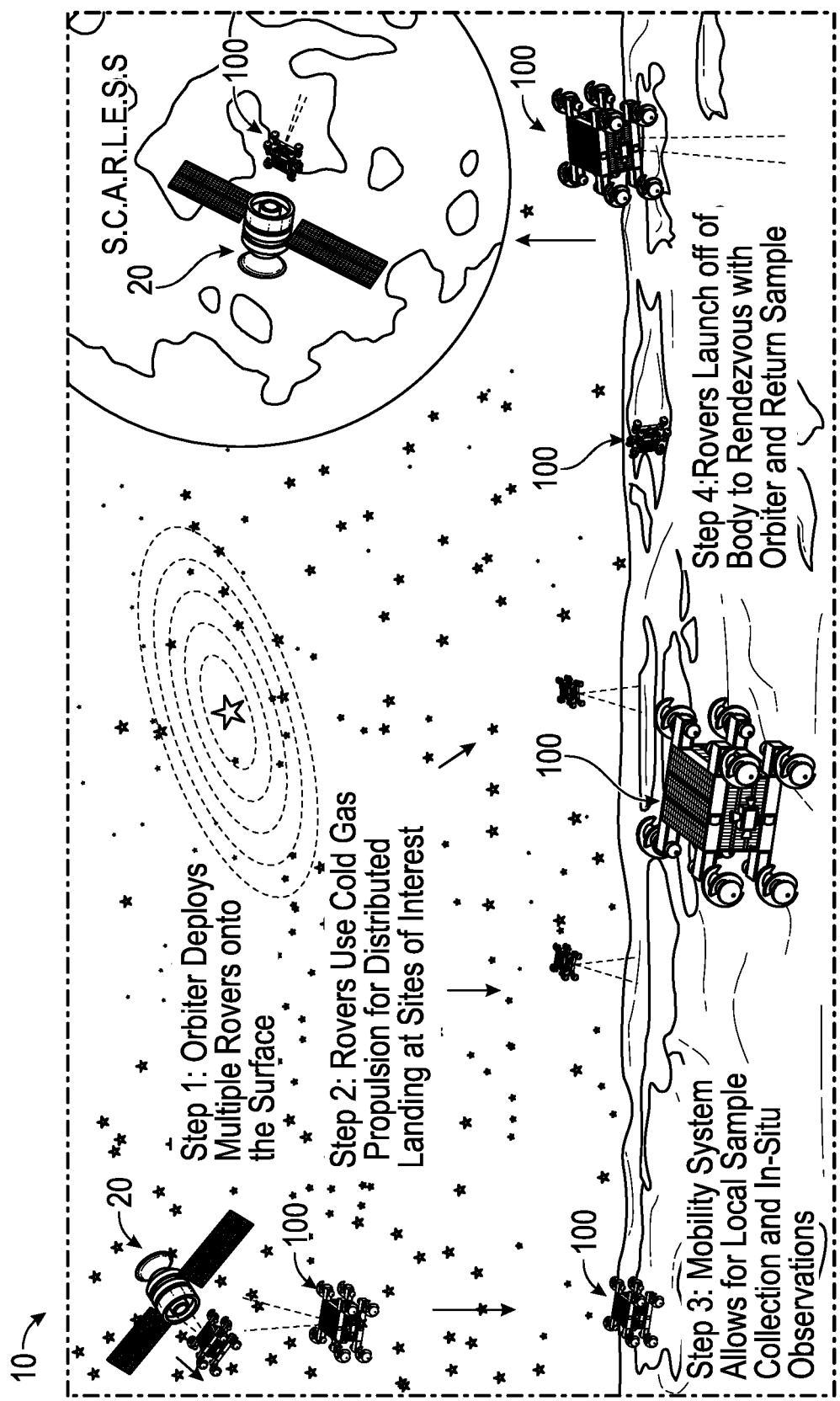
FIG. 13 is a diagram showing a sample collection system for use with the craft of FIG. 1 including an orbiter deploying multiple crafts to a surface of a body.

Referring to FIG. 13, the craft 200 is used as part of a system 10 for sample collection. In particular, a sample collection spacecraft 20 enters into an orbit around a small body for preliminary surveillance and site selection. Once a variety of landing sites are selected, the spacecraft 20 then de-orbits to an appropriate altitude and begins deployment of multiple small (10 kg) rovers such as craft 200 to a surface of the small body. In this disclosure, Phobos (one of Mars' moons) has been selected as a model, but the present system 10 including craft 200 will be feasible with a body of equal or weaker gravity. The crafts 200 descend in various locations using cold gas thrusters 242. The crafts 200 navigates the terrain and take measurements of regolith while collecting samples. The samples are secured inside the housing 102 of the craft. The craft 200 will then rendezvous with the orbiting spacecraft 20 to return the sample.

When the craft 200 lands on the surface of the small body at its target location, the craft 200 mobilizes to take measurements and observations of the local terrain. Screw-shaped wheels 204 can be useful in these environments by enabling two modes of transportation due to the rotational-translational coupling and cancellation of reactive rotation when each pair of wheels 204 counterrotate. Newly developed granular scaling laws make predicting rover dynamics in reduced gravity environments a more manageable task. Additionally, such a mobility system using screw-shaped wheels 204 can also be utilized as a passive sample collection mechanism by rotating the wheels 204 in such a way that the regolith is diverted up into a sample collection chamber (not shown in embodiment 200, but analogous to excavation bin 130 of craft 100) of the craft 200. In the case of accidental entrapment of the craft 200 during collection, the cold gas thrusters 242 can be used to lift the craft 200. After collection is complete, the craft 200 launches from the surface and docks with the orbiting spacecraft 20, securing the collected samples.

As discussed, once landed on the surface of the small body, the craft 200 will use 4 Archimedes screw wheels 204 to traverse multiple types of terrain. The wheels 204 are actuated with pitch actuators 252 each associated with a respective leg 250 including one or more motors to adjust their pitch. The actuated legs 250 can swivel, as shown in FIGS. 11 and 12; the combination of these features gives the craft 200 unique abilities to help it adapt to unknown surface conditions while reducing risk of getting stuck. Archimedes screw wheels 204 are useful in unknown low gravity environments because they enable two modes of transportation. In a granular media environment, the craft 200 can easily propel itself forward in the direction of the wheel-defined axis Q of the wheels 204 by counter-rotating the wheels 204 relative to each other. In rockier terrains, the craft 200 can rotate the wheels 204 in the same direction relative to each other to travel lateral to the long axis Q of the wheels 204. Furthermore, the cold gas thrusters 242 can be used as a last resort to physically lift up the craft 200 if it gets stuck. The craft 200 will collect a regolith sample by opening a door (not shown for embodiment 200, but analogous to excavation ramp 128 of craft 100) in a bottom face of the craft 200 and counter-rotating the wheels 204 rapidly to churn up the material into the center of the bottom face of the craft 200. In the low gravity environment, the angular momentum of the wheels 204 will be enough to cause the regolith to float up into an excavation bin (not shown for embodiment 200 but analogous to excavation bin 130 of craft 100). The door will then close, and the craft 200 can continue surface mobility operations and even collect more samples if more excavation bins are included on the craft 200. Once all excavation bins are filled, the craft 200 will launch itself back to the orbiting spacecraft 20. Once the payload has rendezvoused and docked with the orbiting spacecraft 20, the samples can be transferred to the orbiting spacecraft 20. After this, the craft 200 may return to the surface if there is sufficient fuel remaining, and continue surveying the surface and transmitting data until it runs out of power or when the orbiting spacecraft 20 departs for Earth.

As discussed, the craft 200 includes a cold gas propulsion system including a plurality of thruster modules 240 and one or more propellant tanks 245. This system enables the craft 200 to undock from the orbiting spacecraft 20, deorbit, land on a low-gravity celestial body, launch back into orbit, and dock with the orbiting spacecraft 20 once the surface sample is collected. The feasibility of this method was evaluated by comparing the $\Delta V$ required for the ideal landing maneuver to the available $\Delta V$ that a 10 kg rover would be capable of producing using a modified version of a commercially available cold gas thruster system. Given a 10 kg rover with a 5 kg propulsion system, $\Delta V$ was determined to be approximately 33 m/s for the system. This is roughly 75% more than the 18.5 m/s of $\Delta V$ required to land on Phobos and return to an orbiting spacecraft 20. One embodiment of the thruster system includes two tanks 245 and 16 total thrusters 242, contributing less than 5 kg to an overall weight of the craft 200. A brief study determined that using cold gas thrusters to land a rover and return its sample payload to an orbiter is feasible on bodies the size of Phobos and smaller.

Calculations indicate it is possible to rendezvous the entire 10 kg deployed craft 200 back up to the orbiting spacecraft. However, separation of the collected sample and cold gas system from mobility/instrumentation of the craft 200 would impart two advantages. Greater distance could be covered from the surface by returning just a sample in an excavation bin to the spacecraft 20 with cold gas propulsion, and a remainder of the craft 200 equipped with basic science instrumentation could continue taking measurements for its duration and mobilize on the surface with significantly less mass. Once the payload is launched and delivered, the craft 200 could continue surveying the surface collecting and transmitting data for the life of the craft 200. Exploration of this trade-off between complexity and mobility advantage can be explored. Several forms of sample collection mechanism will also be investigated in a trade study during the first phase of this project. Mimicking the techniques used in the Hayabusa missions as well as OSIRIS-REx are both possibilities. However, there is an opportunity to use the wheels 204 of the craft 200 as a sample collection method since similar mobility methods have been observed to gather material under the body when traversing simulants. Integration of the cold gas thruster system for sample collection is another possibility.

If successful, the craft 200 will enable an entirely different type of sample return mission for small bodies in the solar system. It offers the option of both redundant and more comprehensive sample collection using multiple crafts 200 that can sample different locations, incorporates a mobility system which may be used for both sample collection and surface investigation, and will eliminate a significant risk maneuver for the main spacecraft 20. Investigations into a novel sample collection system that can use the mobility platform to obtain samples will add value for future exploration missions. Further research will be done on using cold gas thrusters to land rovers on small bodies, which could prove useful on future missions. Sample return missions are risky; however, they bring invaluable science back to Earth, allowing scientists to perform tests that can potentially give us insight into the "nature of primitive asteroids, formation of the terrestrial planets, and astrobiology" as detailed by the decadal survey. If the mission is successful on Phobos, it could be scaled up and utilized on moons and other bodies of outer planets such as Triton. Finally, there is a possibility to use a hybridized craft 200 with both cold gas thrusters and surface mobility mechanisms for larger bodies, such as exploring Moon craters to sample hard-to-reach ice deposits.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A multi-modal excavation system comprising:
   a craft comprising:
   a housing including an opening formed along a bottom portion of the housing;
   an excavation ramp in communication with the opening of the housing, the excavation ramp oriented towards a front side of the craft, wherein the excavation ramp accommodates passive collection of a material up the excavation ramp towards a rear side of the craft opposite the front side and into an interior of the housing; and
   a plurality of wheels, each wheel of the plurality of wheels being operatively engaged with a motor of a plurality of motors and a drivetrain mounted along the housing, each of the plurality of wheels defining a screw configuration and including a blade portion that accommodates screw-driven mobility of the craft and the collection of the material along a target surface in a low gravity environment;
   the plurality of wheels including a first wheel along a left-hand side of the housing and a second wheel along a right-hand side of the housing, wherein a blade portion of the first wheel defines a left-hand thread and wherein a blade portion of the second wheel defines a right-hand thread;

wherein rotation of the first wheel in a counterclockwise rotational direction and rotation of the second wheel in a clockwise rotational direction causes the craft to move in a forward direction and generates angular momentum that directs material from underneath the first wheel and the second wheel towards the rear side of the craft into the interior of the housing when the craft is in a low-gravity environment.

2. The multi-modal excavation system of claim 1, wherein the excavation ramp includes a distal free end oriented towards the front side of the craft and a proximal end positioned within the interior of the housing.

3. The multi-modal excavation system of claim 1, wherein the plurality of wheels include Archimedes screw wheels that accommodate engagement to a terrain in the low gravity environment.

4. The multi-modal excavation system of claim 1, further comprising a plurality of bearings engaged with the drivetrain.

5. The multi-modal excavation system of claim 1, wherein each motor of the plurality of motors defines a cavity sealed to prevent the ingress of particulates into the motor.

6. The multi-modal excavation system of claim 1, further comprising one or more thruster modules, each thruster module defining one or more thrusters supplied with a propellant via a single line from one or more propellant tanks.

7. The multi-modal excavation system of claim 6, wherein an orientation of each of the one or more thrusters enables the craft to maneuver within three degrees of freedom.

8. The multi-modal excavation system of claim 6, wherein the propellant is a cold gas.

9. The multi-modal excavation system of claim 1, further comprising:
   a plurality of legs, each of the plurality of wheels engaged with the housing by at least one of the plurality of legs; and
   one or more pitch actuators in operative engagement with the plurality of legs that rotate at least one of the plurality of wheels
   about a horizontal axis Y away from a horizontal axis X to accommodate a slope climbing mode for the craft.

10. The multi-modal excavation system of claim 1, wherein upon rotation of each of the plurality of wheels in a first rotational direction A or an opposite second rotational direction B, a resultant direction of motion of the craft is perpendicular to a wheel axis Q.

11. The multi-modal excavation system of claim 1, wherein upon rotation of a first grouping of wheels on a first side of the craft in a first rotational direction A and simultaneous rotation of a second grouping of wheels on a second side of the craft in a second rotational direction B, a resultant direction of motion of the craft is parallel to a wheel axis Q.

12. The multi-modal excavation system of claim 1, wherein the plurality of wheels are configured to collect the material by rotation of a first grouping of wheels on a first side of craft in a first rotational direction A and simultaneous rotation of a second grouping of wheels on a second side of craft in a second rotational direction B when a free end of the excavation ramp is lowered relative to the housing of the craft.

13. The multi-modal excavation system of claim 1, further comprising:
   a bin positioned within the interior of the housing that receives the material,
   wherein the craft is configured for the low gravity environment and angular momentum of the plurality of wheels directs the material from underneath the plurality of wheels up the excavation ramp into the bin.

14. The multi-modal excavation system of claim 1, wherein the craft is configured to counter-rotate the plurality of wheels at high torque as the excavation ramp is skimmed against the target surface to accommodate the passive collection of the material to within the interior of the housing.

15. A multi-modal excavation system, comprising:
   a craft comprising:
      a housing including an opening formed along the housing;
      an excavation ramp in communication with the opening of the housing, wherein the excavation ramp accommodates passive collection of a material up the excavation ramp and into an interior of the housing; and
      a plurality of wheels mounted along the housing, each of the plurality of wheels defining a screw configuration and including a blade portion that accommodates screw-driven mobility of the craft;
   the plurality of wheels including a first wheel along a left-hand side of the housing and a second wheel along a right-hand side of the housing, wherein a blade portion of the first wheel defines a left-hand thread and wherein a blade portion of the second wheel defines a right-hand thread;
   wherein rotation of the first wheel in a counterclockwise rotational direction and rotation of the second wheel in a clockwise rotational direction causes the craft to move in a forward direction and generates angular momentum that directs material from underneath the first wheel and the second wheel into the interior of the housing when the craft is in a low-gravity environment.

* * * * *